Oct. 8, 1968     W. A. DITTRICH     3,405,288

SOUND AND VIBRATION DETECTOR DEVICE

Filed Feb. 25, 1966

INVENTOR
WILLIAM A. DITTRICH
BY: Harry M. Saragovitz,
Edward J. Kelly, Herbert Berl
& S. Dubroff
ATTORNEYS

United States Patent Office 3,405,288
Patented Oct. 8, 1968

3,405,288
SOUND AND VIBRATION DETECTOR DEVICE
William A. Dittrich, 2405 Ball Road,
Willow Grove, Pa. 19090
Filed Feb. 25, 1966, Ser. No. 531,647
3 Claims. (Cl. 310—8.4)

ABSTRACT OF THE DISCLOSURE

An electrical device for use in the detection of low-frequency pulses and vibrations in objects of low rigid mass, such as the human body, with a piezoelectric crystal as the detector element and a field-effect transistor as the self-contained low impedance output coupling means therefor. All elements of the device are inclosed in a light-weight, thin-walled casing with one electrodal face of the crystal adapted for effectively direct contact with the object to be tested, and with the other electrode in contact with a relatively-heavy inertial mass which is out of contact with the casing so that the pulse and vibrational energy from the object to be tested is used to compress the crystal directly against the inertial mass without the impedance and load of the casing.

---

Figure 1:
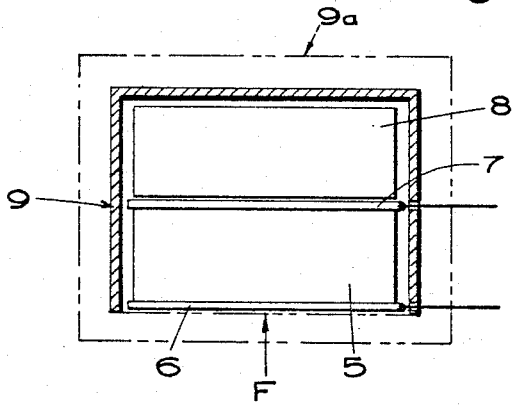

The invention described herein may be manufactured and used by or for the Government for governmental purposes without the payment to me of any royalty thereon.

This invention relates to a device for the detection of sound and vibration in the subsonic, sonic and ultrasonic frequency ranges. Devices of this type consist basically of a piezoelectric crystal one surface of which is placed in direct contact with a source of sound or vibration to be detected. Acceleration or vibratory motion against the surface contacting the source causes a compression of the crystal against the holding element in a casing having a relatively heavy mass. This generates a charge across the crystal which provides a voltage output to a circuit connected to the usual electrodes provided on the crystal. The device therefore translates vibratory motion into electrical energy or volts which is then detected by suitable means to indicate the vibration which is being applied to said circuit.

The main application of a device of this type is as a pick-up or transducer for heart sounds. Presently known available transducers are either standard diaphragm type microphones which have a pocket of air between the diaphragm and the chest wall they are placed against, or are contact microphones which use a contact element pressing against the chest which is mechanically coupled to a piezoelectric crystal or generating element similar to a phonograph type pick-up. Both types suffer from non-linearity caused by mechanical resonances in the devices. The piezoelectric accelerometers in common use contain a holding means or inertial mass in a heavy case which in this application, on a relatively soft chest wall, causes severe signal attenuation. The frequency response and sensitivity are thereby considerably reduced and in addition mechanical linkages use in such microphones and devices are objectionable for the same reasons.

It is therefore a primary object of the present invention to provide an improved device for the detection of sound and vibration in the frequency ranges referred to, having a construction which appreciably increases the frequency response and sensitivity over these ranges and which avoids mechanical linkages heretofore found objectionable in other devices of this type.

It is a further object of this invention to provide an improved piezoelectric device for the detection of sound and vibration which operates with effectively direct contact between the crystal and source of vibrations and with low mass added to that of the source.

It is a still further object of this invention to provide a device for the detection of sound and vibration having an improved interior construction involving the use of a relatively large inertial mass opposing the source of vibration as well as a relatively large piezoelectric crystal to provide improved sensitivity.

It is also a further object of this invention to provide an improved piezoelectric unit for the detection of sound and vibration which is adapted for direct coupling circuits and field-effect transistor means to provide an output circuit with low impedance and hence low noise from the relatively high impedance crystal output.

A still further and important object of this invention is to provide an improved unitary instrument for the detection of sound and vibration in the frequency ranges referred to which provides an appreciable increase in sensitivity over known commercial piezoelectric accelerometer devices and the like when used as a device to detect vibrations from an object which is relatively flexible or low in rigid mass, such as the human body.

In accordance with the invention, the improved sound and vibration detector device or unit utilizes an extremely light-weight casing so that the vibration energy is used to compress the crystal directly without accelerating a massive case as in the past. This provides an appreciable increase in sensitivity over known devices of this type when used to detect vibrations from an object which is relatively smaller than the device or relatively flexible or low in rigid mass.

Contact microphones used for this application usually contains a mechanical coupling system to amplify the force on a small crystal to achieve useable signal output. The device of the present invention makes use of a relatively large crystal with direct coupling to the sensitive surface, combined with an electronic amplifier in the same container to achieve a superior sensitivity with a lack of mechanical resonances and nonlinearity common to the normal microphone. The circuit preferably is an integral part of the microphone or pick-up device and further makes use of the advantages provided by a field-effect transistor as a modified source follower to provide a relatively low impedance signal output circuit.

The invention will further be understood from the following description when considered with reference to the accompanying drawing, and its scope is pointed out in the appended claims.

Figure 2:
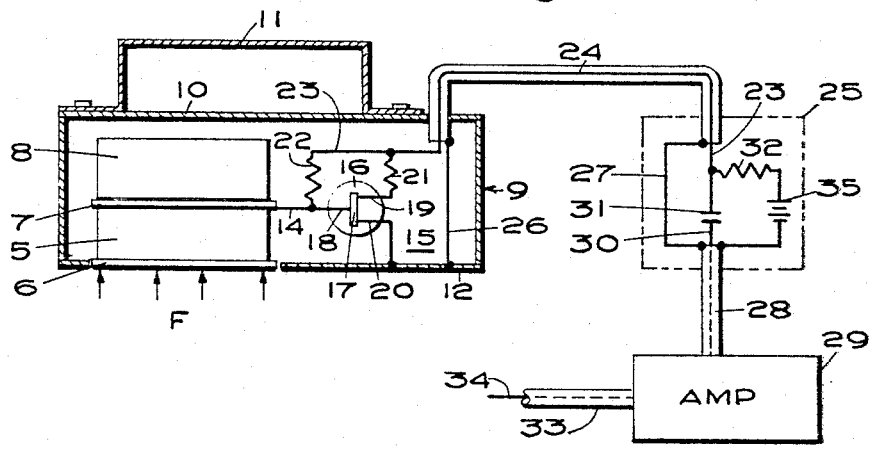

In the drawing, FIG. 1 is a schematic representation of the basic elements of a device of this type having mass and a piezoelectric crystal subjected to a vibratory force applied exteriorally thereto, and FIG. 2 is a cross-sectional view of a device or unit for detection of sound and vibration, embodying the invention, and provided with electronic signal output coupling means also in accordance with the invention and shown schematically by a circuit diagram in connection therewith.

Referring to the drawings, wherein like parts are indicated by like reference numerals throughout both figures, and referring particularly to FIG. 1, the basic principal of operation common to transducer devices of this type involves the translation of vibratory motion into electrical energy through the use of a piezoelectric crystal. In the present example, the crystal 5 is provided with electrodes 6 and 7 on opposite faces thereof, with the electrode 7 in contact with an internal body or mass 8 and with the electrode 6 exposed for operation against any element to be tested which provides a vibratory force applied as indicated by the arrowed line.

In the present transducer a relatively light casing 9 is provided with an open lower end for the electrode 6. In former transducers and as now available commercially, the casing 9a, indicated in dash and dot outline, has a mass which is relatively large in comparison to the mass of the body 8 and of the piezoelectric crystal 5. This causes a reduction in the sensitivity of the device when used to pick up vibrations from an object having a rigid mass which is not appreciably greater than that of the transducer or from an object which is relatively flexible or low in rigid mass, such as the human body.

In the device or unit of the present invention, the casing 9 is extremely light in weight, being constructed of aluminum, plastic or other light material, and having a relatively thin cross-section as shown more particularly in FIG. 2 to which attention is now directed along with FIG. 1. Here the casing 9 is relatively thin-walled and provided with top and bottom closure wall elements 10 and 12 also relatively thin in cross-section and of light weight. A light weight operating handle 11 is attached to the casing at the upper face thereof and the lower wall 12 is adapted to permit the electrode 6 to be engaged by a body to apply a force F thereto as indicated by the arrowed lines or is in the form of a thin diaphragm to readily transfer the force F thereto.

It will thus be seen that in accordance with the invention, an extremely light weight casing is provided so that the vibrating energy is used to compress the crystal directly against the mass 8 without accelerating a massive casing. As pointed out hereinbefore this provides an appreciable increase in sensitivity over the usual commercial piezoelectric device of this type and renders it extremely valuable for use in deriving or detecting vibrations from an object which is relatively flexible or low in rigid mass such as the human body.

This device also makes use of a relatively large crystal 5, a relatively large mass at 8, and an electronic amplifier 15 in the same casing and unit to achieve superior sensitivity with a lack of mechanical resonances and non-linearity common to the normal microphone. The circuit used as an integral part of the pick-up device or unit is further shown in FIG. 2 and includes a field-effect transistor amplifier device 16 having a transistor base or bar 17 of silicon, for example, on which is provided a gate or control electrode 18 and drain and source electrodes 20 and 19, respectively. The input lead or line 14 is connected directly with the piezoelectric crystal electrode 7 which is in contact with the mass or body 8 and suitably insulated therefrom. The electrode 6 on the opposite face is in contact with the casing or actually forms part of the casing and provides a direct ground connection therewith. The drain electrode 20 of the device is likewise directly grounded to the casing while the source electrode 19 is connected through an isolating resistor 21 to an output lead 23. The input electrode also is connected through a coupling resistor 22 with the output lead 23 as indicated.

The lead 23 is in a coaxial cable 24 as the center conductor thereof and is connected with a biasing unit 25. The outer conductor of the cable 24 is connected to ground in the casing 12 through a ground lead connection 26 and is likewise connected through a coupling lead 27 with a shield or outer conductor of an output cable 28 leading to an amplifier unit 29.

The center conductor 30 of the outgoing cable 28 is coupled to the incoming center conductor 23 through a coupling capacitor 31, thereby to permit signal output to flow from the pick-up device through the amplifier 29 and to the output cable 33 and the output center conductor 34 which lead to any utilization device or indicator (not shown) as required for the particular use to which the device is put.

In the unit 25 a biasing voltage is also available for the operating element or transistor 16 and is provided by a small battery 35 connected to the ground provided by the shield on the cable 28 and connected through a coupling resistor 32 to the center conductor 23, thereby bringing current flow through the cable 24 to the amplifier 15 inside the casing 12.

The field-effect transistor 16 provides an effective impedance step-down for the high impedance crystal 5 and its electrodes 6 and 7 and provides a relatively low noise output circuit for coupling to the amplifier 29. In addition, the use of a load resistor and battery at some point distant from the transistor current amplifier circuit is desirable so that the same single conductor coaxial cable may be used to carry both signals and power for the transistor as in the present example. Furthermore the use of the field-effect transistor buffer stage shown provides a very high input impedance required to give good low-frequency response for the system. This transistor may be cast into the mass M or 8 above the crystal to reduce noise and provides a higher impedance than attainable when placed some distance from the pick up. Furthermore the use of a large crystal 5 (1¼" diameter x ¼" thick for example) which has a large capacitance (.05 mf. for example) coupled with the field-effect circuits high input impedance of the order of 200 megohms makes the frequency response down to 0.1 cycle/sec. practical while the high natural resonance provides for good response out to 40,000 cycles/sec. or better.

From the foregoing description it will be seen that a pick-up unit or device for sound and vibration detection of the type described provides the following salient features:

(1) Direct contact between the crystal and source of vibration with low mass added to that of the source by the casing per se.

(2) Use of a relatively large inertial mass opposing the source of vibration as well as a relatively large piezoelectric crystal of relatively high capacity to provide improved sensitivity.

(3) Direct coupling of the electrical output of the crystal to an integral field-effect source follower circuit to provide an output circuit with low impedance and hence low noise.

(4) A circuit design making possible the use of a single coaxial cable to transmit both the output signal and the power or operating current for the source follower circuit.

I claim:
1. An electrical device for use in the detection of pulses and vibrations in the subsonic, sonic and ultrasonic frequency ranges from an object which is flexible and low in rigid mass such as the human body, comprising in combination,
  a relatively-large high-capacity piezoelectric crystal having output electrodes on opposite faces thereof,
  means providing a relatively-heavy inertial mass in contact with said crystal on one face thereof and electrode thereat,
  means providing a signal output connection to said crystal electrodes, and
  a relatively-light thin-walled casing surrounding said elements out of contact with said mass and providing for direct contact with the other and opposite electrode and said object through one wall of said casing, so that the pulse and vibrational energy therefrom is used to compress the crystal directly against the mass without any appreciable casing load for maximum response and output.

2. A sound and low-frequency vibration and pulse detection device for objects of low rigid mass comprising in combination,
  a relatively-light thin-walled casing having one wall as a diaphragm adapted to contact the said objects to be tested for pulse and vibration output,
  a piezoelectric crystal of relatively large size and capacity having one electrode thereof in said one casing wall for vibration and pulse-receiving contact with said objects.
  means providing a relatively large mass connected with the opposite electrode of said piezoelectric device within and out of contact with said casing to apply inertial force to said electrode against movement independently of the casing for maximum response and output, and coupling means for deriving an electric signal output from said piezoelectric device having output connections with said crystal through said electrodes.

3. A sound and low-frequency vibration and pulse detecting device as defined in claim 2, wherein the output coupling means provided includes, a field-effect transistor connected in circuit as a modified source follower to provide a low-impedance output connection for said device, and a cable connection therewith for an external amplifier and bias supply means, thereby to provide a relatively-high-amplitude signal output from said device and to maintain the weight and size of said device within relatively-low limits for use with low-amplitude pulse and vibration sources of low rigid mass.

References Cited

UNITED STATES PATENTS

| | | | |
|---|---|---|---|
| 2,972,068 | 2/1961 | Howry | 310—8.7 |
| 3,079,584 | 2/1963 | Sims | 310—8.7 |
| 3,054,982 | 9/1962 | Kieser | 310—8.7 |
| 3,090,939 | 5/1963 | Massa | 310—8.7 |
| 3,148,677 | 9/1964 | Smith | 310—8.7 |
| 3,239,696 | 3/1966 | Burkhalter | 310—8.7 |
| 3,294,988 | 12/1966 | Packard | 310—8.7 |
| 3,322,980 | 5/1967 | Faure | 310—8.7 |

J. D. MILLER, *Primary Examiner.*